(12) United States Patent
Aoki et al.

(10) Patent No.: US 12,719,886 B2

(45) Date of Patent: Aug. 25, 2026

(54) SYSTEM AND METHOD OF DETECTING MULTIFACTOR AUTHORIZATION ATTACK

(71) Applicants: RAKUTEN SYMPHONY, INC., Tokyo (JP); RAKUTEN MOBILE, INC., Tokyo (JP)

(72) Inventors: Sota Aoki, Tokyo (JP); Maheshwaran Palanivelu, Tokyo (JP); Winston Poniente, Tokyo (JP)

(73) Assignees: RAKUTEN SYMPHONY, INC., Tokyo (JP); RAKUTEN MOBILE, INC., Tokyo (JP)

( * ) Notice: Subject to any disclaimer, the term of this patent is extended or adjusted under 35 U.S.C. 154(b) by 288 days.

(21) Appl. No.: 18/021,411

(22) PCT Filed: Jan. 19, 2023

(86) PCT No.: PCT/US2023/011121

§ 371 (c)(1),
(2) Date: Feb. 15, 2023

(87) PCT Pub. No.: WO2024/155279

PCT Pub. Date: Jul. 25, 2024

(65) Prior Publication Data

US 2025/0080546 A1 Mar. 6, 2025

(51) Int. Cl.
*H04L 9/40* (2022.01)

(52) U.S. Cl.
CPC ................................ *H04L 63/1416* (2013.01)

(58) Field of Classification Search
CPC ........... H04L 63/1416; H04L 2463/082; H04L 9/0894; H04L 9/14; H04L 9/3226; H04L 63/083; G06F 21/35; H04W 12/06
See application file for complete search history.

(56) References Cited

U.S. PATENT DOCUMENTS 7,346,930 B1 * 3/2008 Boydstun ................ H04L 63/02 726/29
7,496,662 B1 * 2/2009 Roesch ............... H04L 63/1433 709/224
7,565,696 B1 * 7/2009 Njemanze ............... H04L 63/20 709/224
8,312,540 B1 * 11/2012 Kahn .................... G06F 21/552 726/25

(Continued)

OTHER PUBLICATIONS

Written Opinion of the International Searching Authority issued May 16, 2023 in Application No. PCT/US2023/011121.

(Continued)

*Primary Examiner* — Aravind K Moorthy
(74) *Attorney, Agent, or Firm* — Sughrue Mion, PLLC

(57) ABSTRACT

A method of detecting an MFA attack includes identifying at least one MFA failure condition corresponding to at least one failed login attempt of a user, detecting a successful login attempt of the user following the identification of the at least one MFA failure condition, determining whether a login violation condition of the successful login attempt occurs within a first predetermined time period from the detection of the successful login attempt, determining an MFA attack occurs based on determining that the login violation condition occurs within the first predetermined time period.

20 Claims, 7 Drawing Sheets

(56) References Cited

U.S. PATENT DOCUMENTS 8,555,357 B1 * 10/2013 Gauvin ............... H04L 63/1441 726/6
8,973,113 B1 * 3/2015 Eatough .................. H04L 63/08 726/6
9,049,596 B1 * 6/2015 Kronrod ............. H04W 12/126
9,075,979 B1 * 7/2015 Queru ................... H04W 64/00
9,305,151 B1 * 4/2016 Dotan ..................... G06F 21/31
9,514,294 B1 * 12/2016 Hepburn ............. H04L 63/0281
9,547,763 B1 * 1/2017 Avital ................. H04L 63/0861
9,571,497 B1 * 2/2017 Venkataramani ....... H04L 63/10
9,589,397 B1 * 3/2017 Christopher .......... H04W 12/06
9,967,742 B1 * 5/2018 Belton, Jr. .......... H04W 12/069
10,057,227 B1 * 8/2018 Hess ........................ G06F 21/31
10,360,367 B1 * 7/2019 Mossoba ............... G06F 3/0658
10,437,983 B1 * 10/2019 Fessel ................... G06F 3/0673
10,574,697 B1 * 2/2020 McClintock ........ H04L 63/1491
10,891,372 B1 * 1/2021 Shahbazi ............ H04L 63/0815
10,931,686 B1 * 2/2021 Mehta ................. H04L 63/1416
10,951,606 B1 * 3/2021 Shahidzadeh ......... H04L 63/107
11,171,990 B1 * 11/2021 Yenamandra ....... H04L 63/1433
11,405,189 B1 * 8/2022 Bennison ................ H04L 9/083
11,411,968 B1 * 8/2022 Banerjee ............. H04L 63/1425
11,516,666 B1 * 11/2022 Kahn .................... H04W 12/77
11,546,263 B1 * 1/2023 Klaedtke .............. H04L 47/225
11,558,365 B1 * 1/2023 McCorkendale ..... H04L 63/083
11,640,470 B1 * 5/2023 Amar ................ G06Q 10/0635 726/22
11,658,964 B2 * 5/2023 Yarabolu ............... H04W 12/68 726/5
11,741,216 B1 * 8/2023 Dods ..................... H04L 9/0891 713/189
11,799,632 B1 * 10/2023 Valkaitis ............... H04L 9/0822
11,855,989 B1 * 12/2023 Hall ...................... H04L 63/101
11,863,564 B1 * 1/2024 Podemsky ......... G06Q 30/0609
12,001,643 B1 * 6/2024 Garg ................... G06F 3/04812
12,058,137 B1 * 8/2024 Hanwella ............ H04L 63/0263
12,182,237 B2 * 12/2024 Mozano ................ G06F 21/604
12,204,650 B2 * 1/2025 Bhatia ..................... G06F 21/55
12,519,771 B2 * 1/2026 Liu ..................... H04L 63/0823
12,580,738 B1 * 3/2026 Nair ...................... H04L 9/0822
2003/0101359 A1 * 5/2003 Aschen ................... G06F 21/55 726/23
2003/0229706 A1 * 12/2003 Park ................... G06Q 30/0601 705/26.1
2005/0081045 A1 * 4/2005 Nicodemus ........... H04L 9/3226 713/182
2005/0203881 A1 * 9/2005 Sakamoto ............... B29C 48/91
2005/0251860 A1 * 11/2005 Saurabh ................ G06F 21/552 726/23
2005/0268107 A1 * 12/2005 Harris ................. H04L 63/0853 713/182
2008/0168543 A1 * 7/2008 von Krogh ............... H04L 9/12 726/9
2008/0171588 A1 * 7/2008 Atashband .......... G07F 17/3232 463/20
2008/0222696 A1 * 9/2008 Nicodemus ........... H04L 63/102 726/1
2008/0282338 A1 * 11/2008 Beer ................... H04L 63/1408 726/22
2008/0289033 A1 * 11/2008 Hamilton .............. H04L 63/107 726/19
2009/0300503 A1 * 12/2009 Suhm ...................... G10L 13/00 704/260
2011/0239278 A1 * 9/2011 Downey ............... H04L 63/083 726/4
2011/0277025 A1 * 11/2011 Counterman ........... G06F 21/40 726/8
2013/0055346 A1 * 2/2013 Singh ...................... H04L 63/08 726/3
2013/0132732 A1 * 5/2013 Adams .................. H04L 9/3271 713/186
2013/0139179 A1 * 5/2013 Roll ...................... G06F 11/079 719/318
2013/0174241 A1 * 7/2013 Cha ..................... H04L 63/0815 726/7
2013/0185778 A1 * 7/2013 Tamai ..................... G06F 21/36 726/6
2013/0185779 A1 * 7/2013 Tamai ................. H04L 63/0838 726/6
2013/0198819 A1 * 8/2013 Gordon ................... G06F 21/45 726/5
2013/0227651 A1 * 8/2013 Schultz ................... G06F 21/32 726/4
2013/0346757 A1 * 12/2013 Nick ..................... G06F 21/554 726/19
2014/0053252 A1 * 2/2014 Kelsey .................. H04L 63/104 726/6
2014/0157381 A1 * 6/2014 Disraeli .............. H04L 63/0853 726/7
2014/0181968 A1 * 6/2014 Ge ...................... H04L 63/1416 726/23
2014/0208406 A1 * 7/2014 Austin ................ H04L 63/0272 726/7
2014/0237591 A1 * 8/2014 Niemela ................. G06F 21/57 726/22
2014/0245389 A1 * 8/2014 Oberheide .......... H04L 63/0815 726/3
2014/0245396 A1 * 8/2014 Oberheide ............. G06F 21/40 726/4
2014/0282976 A1 * 9/2014 Holmelin ................ H04L 63/08 726/7
2014/0344337 A1 * 11/2014 Sramka ............... H04L 65/1104 709/203
2015/0095999 A1 * 4/2015 Toth ...................... H04L 9/3263 726/6
2015/0124963 A1 * 5/2015 Mccusker ............ H04L 9/0847 380/46
2015/0215314 A1 * 7/2015 Pisharody ............... G06F 21/32 726/7
2015/0281279 A1 * 10/2015 Smith ..................... H04L 63/08 726/1
2015/0302252 A1 * 10/2015 Herrera .................. G06V 40/70 382/117
2015/0347734 A1 * 12/2015 Beigi .................... H04L 9/3268 726/28
2016/0072793 A1 * 3/2016 Brock ................... H04L 63/083 726/6
2016/0086155 A1 * 3/2016 Candelore ............ G06Q 20/425 705/21
2016/0087957 A1 * 3/2016 Shah ..................... H04L 63/205 726/1
2016/0269237 A1 * 9/2016 Higgins ................ H04W 12/08
2016/0286393 A1 * 9/2016 Rasheed ............. H04L 63/0853
2016/0365729 A1 * 12/2016 Pochana ................. H02J 3/388
2016/0371661 A1 * 12/2016 Shah ...................... G06Q 40/03
2017/0006060 A1 * 1/2017 Venkataramani ... H04W 12/122
2017/0031741 A1 * 2/2017 Seigel ................. G06F 11/0709
2017/0039368 A1 * 2/2017 Grobman ................ G06F 21/74
2017/0070497 A1 * 3/2017 McCallum ............ H04L 9/3231
2017/0093867 A1 * 3/2017 Burns ................... H04L 63/107
2017/0148009 A1 * 5/2017 Perez Lafuente .. G06Q 20/3223
2017/0169360 A1 * 6/2017 Veeramachaneni ..... G06F 21/56
2017/0187725 A1 * 6/2017 Lahtiranta ............. H04L 63/083
2017/0214679 A1 * 7/2017 Lin ........................ H04L 63/083
2017/0214712 A1 * 7/2017 Maxwell ............. H04L 63/1441
2017/0230179 A1 * 8/2017 Mannan ................ H04L 9/3226
2017/0230357 A1 * 8/2017 Canfield ................. G06F 21/45
2017/0318460 A1 * 11/2017 Kumar ................. H04B 10/116
2017/0346809 A1 * 11/2017 Plotnik ................. H04L 63/123
2017/0374070 A1 * 12/2017 Shah ........................ H04L 63/20
2018/0032707 A1 * 2/2018 Sakamoto ............. H04L 63/083
2018/0034859 A1 * 2/2018 Aronowitz ............. H04L 63/08
2018/0063128 A1 * 3/2018 Korus ..................... G06F 21/40
2018/0097840 A1 * 4/2018 Murthy ................... H04L 63/02
2018/0165115 A1 * 6/2018 Fusaro .................. H04L 63/105
2019/0044942 A1 * 2/2019 Gordon ............. H03M 13/3972
2019/0089688 A1 * 3/2019 Rathineswaran ..... H04L 63/105
2019/0109833 A1 * 4/2019 Segu ....................... H04L 63/08
2019/0121989 A1 * 4/2019 Mousseau ............... H04W 4/70
2019/0130082 A1 * 5/2019 Alameh .............. G06F 21/6218

(56) References Cited

U.S. PATENT DOCUMENTS

2019/0197549 A1* 6/2019 Sharma .................. G06N 3/045
2019/0253509 A1* 8/2019 Kumar .................... H04L 63/08
2019/0297079 A1* 9/2019 Delcourt ............... G06F 21/554
2020/0051115 A1* 2/2020 Lawrence ............. H04W 12/77
2020/0074439 A1* 3/2020 Hayman ............ G06Q 20/3224
2020/0092284 A1* 3/2020 Zhu ...................... H04L 9/3234
2020/0110870 A1* 4/2020 Girdhar ................. G06F 21/316
2020/0117780 A1* 4/2020 Kaladgi .................. G06F 3/011
2020/0128047 A1* 4/2020 Biswas ................... H04L 67/10
2020/0169570 A1* 5/2020 Kleymenov ........ H04L 63/1416
2020/0213334 A1* 7/2020 Kutner ................ H04L 63/1416
2020/0228337 A1* 7/2020 Sumien ............... H04W 12/069
2020/0228979 A1* 7/2020 Syed ..................... H04W 12/12
2020/0244625 A1* 7/2020 Tummalapenta ... H04L 12/4633
2020/0244650 A1* 7/2020 Burris ................. H04L 63/0861
2020/0334123 A1* 10/2020 Chatterjee ........... G06F 11/0793
2020/0344224 A1* 10/2020 Hochman ........... H04L 63/0815
2020/0358769 A1* 11/2020 Belov ................... H04L 63/083
2020/0359204 A1* 11/2020 Hawkins ............ H04B 7/18565
2020/0374287 A1* 11/2020 Bowie ................... H04W 12/06
2020/0382498 A1* 12/2020 He ........................ H04L 63/083
2020/0396239 A1* 12/2020 Kaidi .................. H04L 63/1416
2021/0014064 A1* 1/2021 Channa ............... H04L 63/0876
2021/0090816 A1* 3/2021 Ibrahim ................. G06N 20/00
2021/0099451 A1* 4/2021 Will .................... H04L 63/0876
2021/0099874 A1* 4/2021 Suraparaju .......... H04W 12/041
2021/0105285 A1* 4/2021 Simakov ............ G06Q 30/0185
2021/0112065 A1* 4/2021 Yang ................... H04L 63/0815
2021/0120418 A1* 4/2021 Jabbar ................... H04W 12/06
2021/0124816 A1* 4/2021 Ebner ..................... G06F 21/40
2021/0126940 A1* 4/2021 O'Hara ................. H04L 63/126
2021/0152537 A1* 5/2021 Bengani ................ H04L 63/123
2021/0152571 A1* 5/2021 Varnavas ............ H04L 63/1425
2021/0174318 A1* 6/2021 Kaidi ..................... G06Q 20/10
2021/0185084 A1* 6/2021 Sodja .................. H04L 63/1458
2021/0192063 A1* 6/2021 Goldstone ........... G06F 21/6245
2021/0194883 A1* 6/2021 Badhwar ............... H04L 63/107
2021/0194930 A1* 6/2021 Wendt ................. H04L 41/0893
2021/0273967 A1* 9/2021 Vela .................... H04L 63/1466
2021/0314149 A1* 10/2021 Yee ........................ H04L 67/51
2021/0326993 A1* 10/2021 Dang ..................... G06Q 40/08
2021/0326994 A1* 10/2021 Dang ..................... G06Q 40/08
2021/0336972 A1* 10/2021 Ke ...................... H04L 63/1425
2021/0344708 A1* 11/2021 Nicusor-Sorin .... H04L 63/1466
2021/0352069 A1* 11/2021 Momchilov ............ G06F 21/32
2021/0352088 A1* 11/2021 Adams .................... G06F 21/44
2021/0397692 A1* 12/2021 Tan ......................... G06F 21/36
2022/0021706 A1* 1/2022 Jubilee .................... H04L 63/08
2022/0038463 A1* 2/2022 Burlitskiy ............... H04L 63/10
2022/0060479 A1* 2/2022 Perkins ................. H04L 63/083
2022/0070163 A1* 3/2022 Yarabolu ............... H04L 63/105
2022/0085984 A1* 3/2022 Khandani ............. H04L 9/0822
2022/0107997 A1* 4/2022 Sethi ....................... G06F 21/54
2022/0124104 A1* 4/2022 Agatone ............. H04L 63/1416
2022/0131844 A1* 4/2022 Sherlock ............... H04L 63/105
2022/0158999 A1* 5/2022 Kaidi .................. H04L 63/0884
2022/0182397 A1* 6/2022 Romero Zambrano .................... H04L 63/1416
2022/0197989 A1* 6/2022 Rakshit ................... G06F 3/017
2022/0198466 A1* 6/2022 Maruyama ............. G06Q 30/06
2022/0207135 A1* 6/2022 Jajoo ...................... G06N 20/00
2022/0210144 A1* 6/2022 Wagner ................... H04L 63/20
2022/0239504 A1* 7/2022 Rothschild ............ H04L 9/0825
2022/0239709 A1* 7/2022 Ittelson ................. H04L 63/083
2022/0239799 A1* 7/2022 Hosoda ................... G06F 21/31
2022/0247762 A1* 8/2022 Jasleen ................... H04L 63/20
2022/0247763 A1* 8/2022 Bob ........................ H04L 45/42
2022/0255924 A1* 8/2022 Michaud ................ G06N 20/00
2022/0255926 A1* 8/2022 Crabtree ............. H04L 63/1425
2022/0255934 A1* 8/2022 Henry ................. H04L 63/0884
2022/0262370 A1* 8/2022 Carroll .................... G10L 17/14
2022/0269769 A1* 8/2022 Ben-Natan ............. G06F 21/41
2022/0277090 A1* 9/2022 Narita ...................... G06F 21/40
2022/0294826 A1* 9/2022 Bowie ..................... H04L 63/20
2022/0303289 A1* 9/2022 Townsend ............. G06F 16/955
2022/0366068 A1* 11/2022 Sankar ................ G06F 16/2379
2022/0385656 A1* 12/2022 Gujarathi ............ H04L 63/0876
2022/0394024 A1* 12/2022 Bulgakov ............... H04L 67/51
2022/0414202 A1* 12/2022 Tourani .................. G06F 21/35
2022/0417229 A1* 12/2022 Sood ...................... G06N 20/00
2023/0053182 A1* 2/2023 Bertiger .............. H04L 63/1425
2023/0064529 A1* 3/2023 Nunez ................... H04L 9/3213
2023/0082633 A1* 3/2023 Seletskiy ............ H04L 63/1425 726/7
2023/0086281 A1* 3/2023 Kaidi .................. H04L 63/1416 726/22
2023/0089920 A1* 3/2023 Post ...................... H04L 63/126 726/5
2023/0090132 A1* 3/2023 Babourine ............. G06F 21/31 726/23
2023/0093143 A1* 3/2023 Kaidi ...................... G06F 21/31 726/6
2023/0134546 A1* 5/2023 Gopalakrishnan ..... G06N 20/20 726/23
2023/0156008 A1* 5/2023 Alotaibi .................. H04L 63/20 726/1
2023/0156020 A1* 5/2023 McCarthy ............... H04L 63/20 726/22
2023/0169156 A1* 6/2023 Mozano .............. G06F 21/6218 726/4
2023/0179612 A1* 6/2023 Inon ...................... H04L 63/083 726/23
2023/0179637 A1* 6/2023 Nunn .................. H04L 63/0227 726/1
2023/0223031 A1* 7/2023 Sharifi .................. H04L 9/3231 704/246
2023/0244769 A1* 8/2023 Wallach ............... G06V 40/172 726/2
2023/0244775 A1* 8/2023 Alexander ............ G06F 21/316 726/18
2023/0262054 A1* 8/2023 Marasco ............. H04L 63/0861 726/4
2023/0300152 A1* 9/2023 Brancato ............. H04L 63/1425 726/23
2023/0327876 A1* 10/2023 Kaga ..................... H04L 9/0866 713/186
2023/0362193 A1* 11/2023 Singh .................. H04L 63/0838
2023/0401304 A1* 12/2023 Abdou ..................... G06F 21/32
2024/0037212 A1* 2/2024 Rajendran ............. G06F 21/445
2024/0037213 A1* 2/2024 Rajendran ............. G06F 21/445
2024/0054196 A1* 2/2024 Nainar .................. H04W 12/33
2024/0061923 A1* 2/2024 Salisbury .............. G06F 21/316
2024/0095740 A1* 3/2024 Fenichel .................. G06N 3/09
2024/0107301 A1* 3/2024 Koral .................... H04W 12/63
2024/0114031 A1* 4/2024 Taylor ..................... H04L 63/08
2024/0121237 A1* 4/2024 Ozugur ................. H04L 63/083
2024/0146544 A1* 5/2024 Graves ................ H04L 63/0823
2024/0195808 A1* 6/2024 Joshi ................... H04L 63/0884
2024/0205248 A1* 6/2024 Gehtman ............ H04L 63/1425
2024/0223539 A1* 7/2024 Bakshi .................. H04L 63/083
2025/0158980 A1* 5/2025 Li ........................... H04L 63/08

OTHER PUBLICATIONS

International Search Report issued May 16, 2023 in Application No. PCT/US2023/011121.

* cited by examiner

SYSTEM AND METHOD OF DETECTING MULTIFACTOR AUTHORIZATION ATTACK

CROSS REFERENCE TO RELATED APPLICATIONS

This application is a National Stage of International Application No. PCT/US2023/011121 filed Jan. 19, 2023.

1. FIELD

Apparatuses and methods consistent with example embodiments of the present disclosure relate to detecting multifactor authentication (MFA) attacks.

2. DESCRIPTION OF RELATED ART

In related art, multifactor authentication (MFA) attacks, such as MFA fatigue (also referred to as MFA push spam, MFA bombing, and/or prompt bombing), is a strategy used by hackers to circumvent MFA when breaking into user accounts. Using stolen, leaked, or guessed credentials for login attempts, the account owner (i.e., the real user) may be continuously bombarded with prompts, alerts, notifications, etc., requesting verification of identity and/or verification of the login attempt. The bombardment may continue until the user is psychologically worn and authorizes the notifications, the user accidentally verifies the false login attempt, etc.

Since the MFA attack employs social engineering techniques, there is no technical way to prevent such attacks in the related art.

SUMMARY

According to embodiments, systems and methods are provided for detecting multifactor authentication (MFA) attacks.

According to an aspect of the disclosure, a method of detecting an MFA attack may include identifying at least one MFA failure condition corresponding to at least one failed login attempt of a user, detecting a successful login attempt of the user following the identification of the at least one MFA failure condition, determining whether a login violation condition of the successful login attempt occurs within a first predetermined time period from the detection of the successful login attempt, determining an MFA attack occurs based on determining that the login violation condition occurs within the first predetermined time period.

According to an aspect of the disclosure, a system for detecting an MFA attack may include a memory storing instructions and a processor configured to execute the instructions to identify at least one MFA failure condition corresponding to at least one failed login attempt of a user, detect a successful login attempt of the user following the identification of the at least one MFA failure condition, determine whether a login violation condition of the successful login attempt occurs within a first predetermined time period from the detection of the successful login attempt, and determine that an MFA attack occurs based on determining that the login violation condition occurs within the first predetermined time period.

According to an aspect of the disclosure, a non-transitory computer-readable storage medium may store instructions that, when executed by at least one processor, cause the at least one processor to identify at least one MFA failure condition corresponding to at least one failed login attempt of a user, detect a successful login attempt of the user following the identification of the at least one MFA failure condition, determine whether a login violation condition of the successful login attempt occurs within a first predetermined time period from the detection of the successful login attempt, and determine an MFA attack occurs based on determining that the login violation condition occurs within the first predetermined time period.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

Figure 1A:
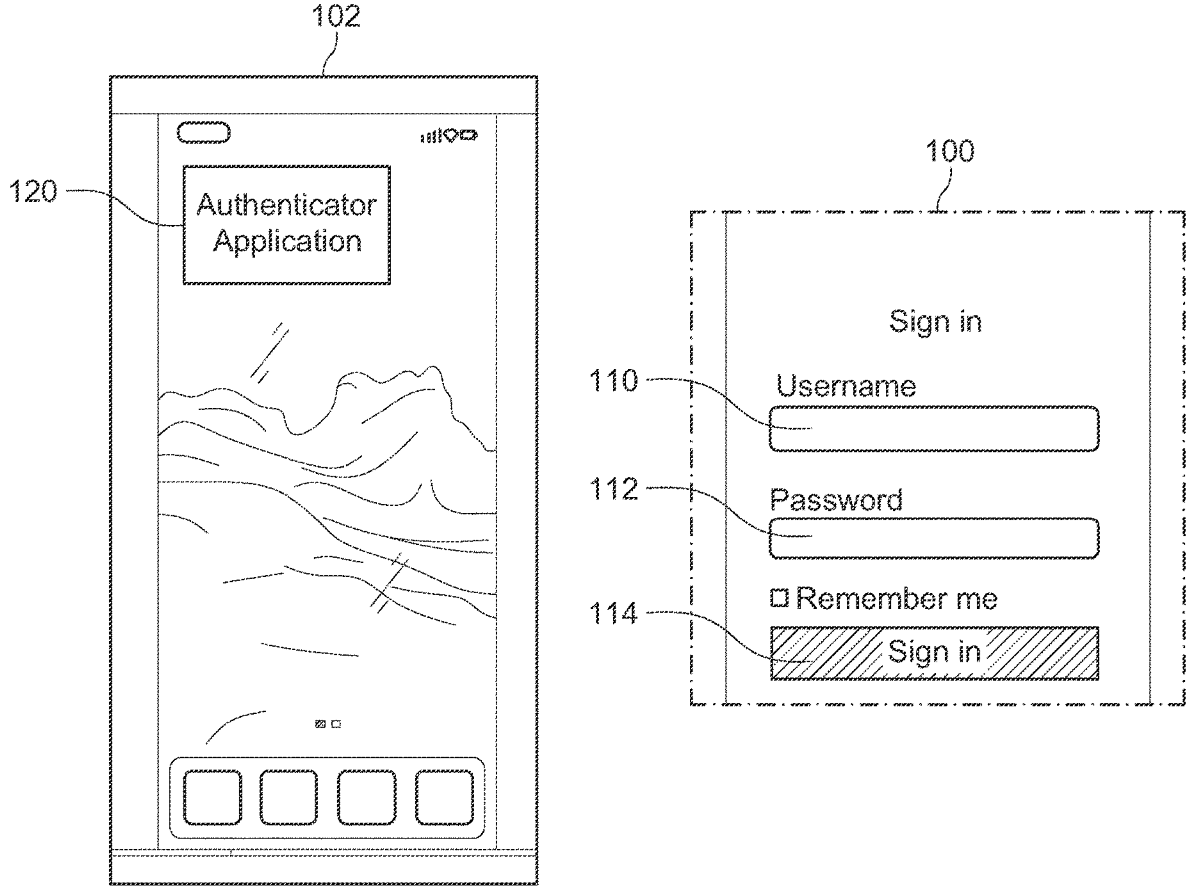
FIGS. 1A, 1B and 1C are diagrams illustrating an example of a multifactor authentication (MFA) attack, according to an embodiment.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and system in which a multifactor authentication (MFA) attack may be detected. The MFA attack may be referred to as MFA fatigue, MFA push spam, MFA bombing, prompt bombing, etc. The system may identify at least one MFA failure condition corresponding to at least one failed login attempt of a user, detect a successful login attempt of the user following the identification of the at least one MFA failure condition, determine whether a login violation condition of the successful login attempt occurs within a first predetermined time period from the detection of the successful login attempt, and determine that an MFA attack occurs based on determining that the login violation condition occurs within the first predetermined time period.

Thus, the system and method may detect MFA attacks that are followed by a successful login from a new source internet protocol (IP) address or location based on a customized threat scenario. The customized threat scenario may include one or a combination of multiple threat identifiers and/or predefined conditions. Accordingly, attack behaviors specific to MFA attacks followed by successful login attempts from new IP addresses or new locations may be accurately and effectively detected, thereby increasing the likelihood of capturing a true positive MFA attack.

Provided are systems and methods having threat scenarios that combine multiple threat identifiers, such as MFA failure conditions and login violation conditions, which allow for sequential event detection where an attacker sends multiple MFA push notifications to a victim device followed by a successful login attempt from a new source IP address or location. The systems and methods provide prompt responses following the detection of the suspected attack activity, which may prevent major data breaches that can lead to loss in revenue and/or reputation.

Figure 1B:
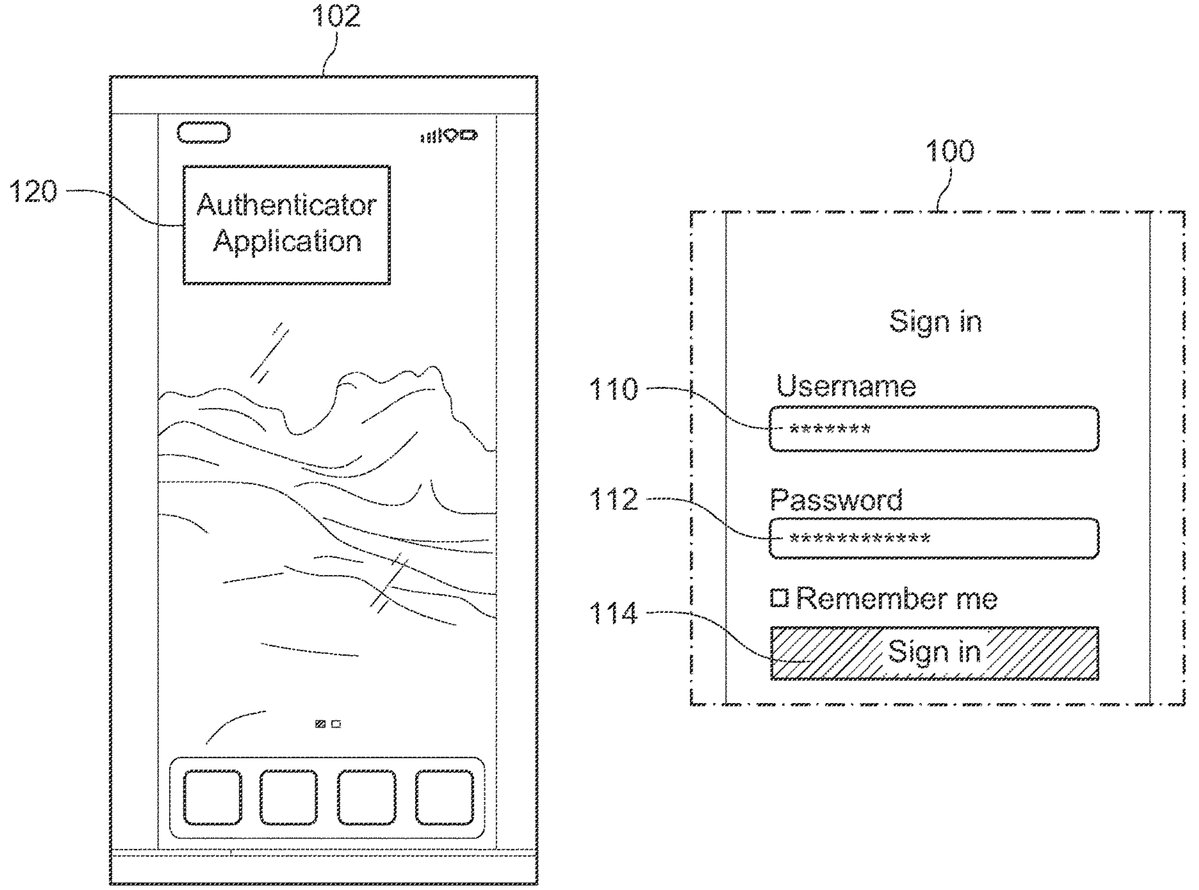
Figure 1C:
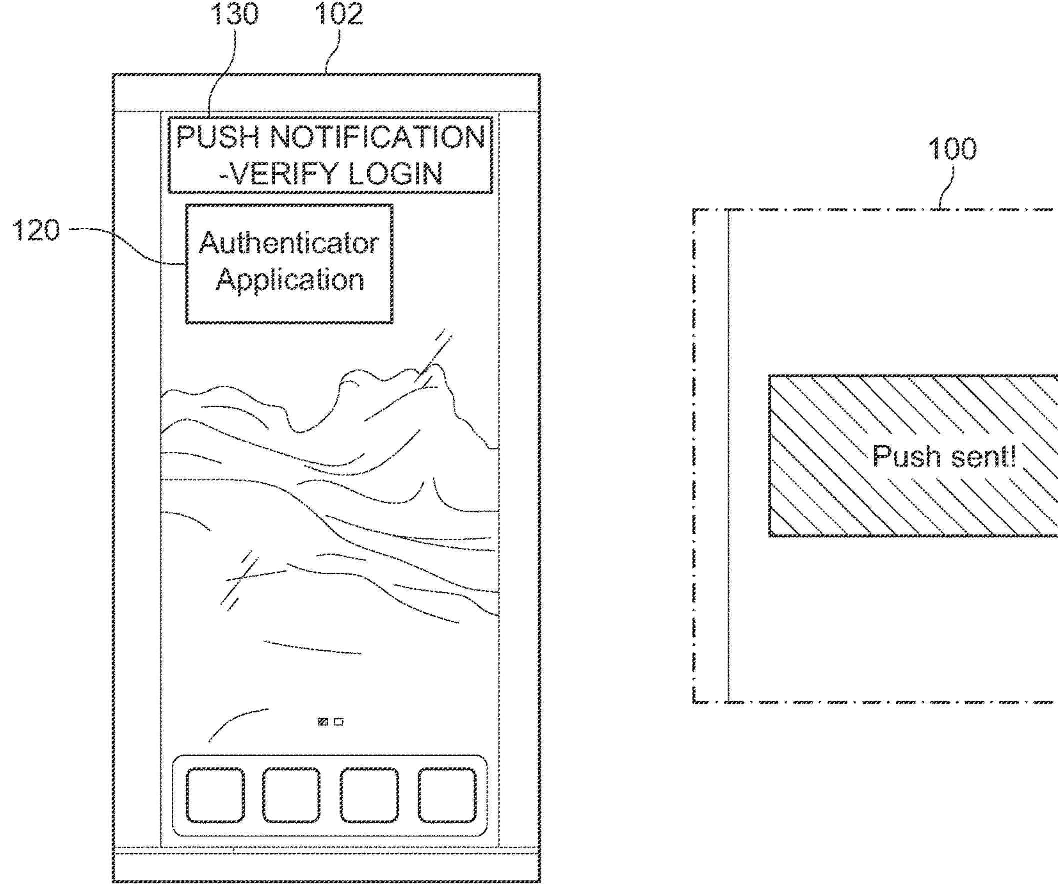

FIGS. 1A, 1B and 1C are diagrams illustrating an example of an MFA attack, according to an embodiment. Referring to FIG. 1A, a screen of an access device 100 and a screen of a user device 102 are shown. The access device 100 may correspond to a device providing an access prompt into a system, including a user name field 110 and a password field 112. The user device 102 may correspond to a device of a user that includes an authenticator application 120 (e.g., Microsoft Authenticator, Google Authenticator, Okta, etc.) for MFA, verifying a login attempt to the system being accessed from the access device 100. It is noted that the access device 100 and the user device 102 may be the same device in some embodiments, but are depicted as separate devices for ease of description.

As shown in FIG. 1B, a perpetrator of an MFA attack may illicitly obtain the user's credentials (e.g., via hacking, via guessing, via data leaks, directly from the user, etc.) and then enter the credentials into the access device 100 via the user name field 110 and the password field 112. Upon entering the credentials into the access device 100, the perpetrator may submit the credentials via the "sign in" icon 114. Referring to FIG. 1C, upon submitting the credentials, the authenticator application 120 may be initiated, providing a push notification 130 to the user device 102 requesting confirmation of the login attempt by the perpetrator on the access device 100. A push notification 130 is depicted, however other verification notifications may be provided to the user device 102, such as emails, additional passcodes, etc., as will be understood by one of ordinary skill in the art from the disclosure herein. In response to receiving the push notification 130, the user of the user device 102 may recognize the login attempt as being fraudulent and then ignore the push notification 130 or decline/fail to confirm the login attempt, resulting in a failed login attempt by the perpetrator.

In an MFA attack scheme, the perpetrator may continue to repeat the fraudulent access to the system from the access device 100, causing multiple push notifications to be repeatedly sent to the user of the user device 102. As the MFA attack fatigue sets in, or for other reasons (such as user error), the user of the user device 102 may accept or authorize the login attempt via the authenticator application 120, causing a successful login attempt after one or more failed login attempts occur. Accordingly, the provided systems and methods disclosed herein are configured to further detect whether the successful login attempt is the result of an MFA attack, and then correct the situation accordingly.

Figure 2:
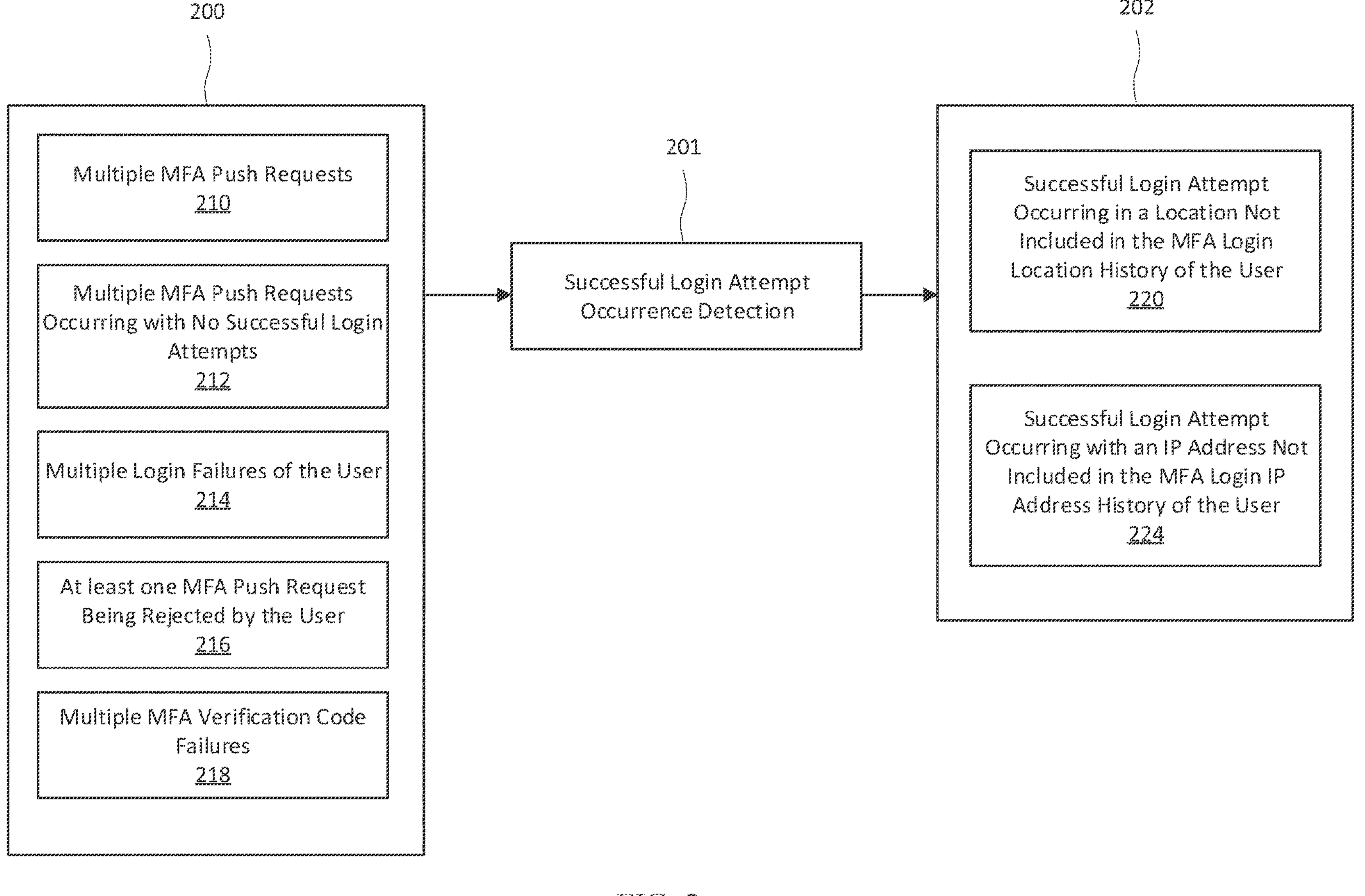
FIG. 2 is a diagram illustrating an operation flow for detection of an MFA attack, according to an embodiment.

FIG. 2 is a diagram illustrating an operation flow for detection of an MFA attack, according to an embodiment. The detection of an MFA attack may include two stages, a first stage 200 and a second stage 202. The first stage 200 may include identification of MFA failure conditions, and the second stage 202 may include determination of login violation conditions, as is described in detail below.

In the first stage 200, the system may be configured to identify at least one MFA failure condition. The MFA failure conditions may correspond to failed login attempts of the user (e.g., failed login attempts corresponding to the user credentials but implemented by an MFA attack perpetrator). The MFA failure conditions may include multiple MFA push requests 210. Multiple MFA push requests may correspond to a number of push requests sent to a user device via an authenticator application to verify a login attempt. The system may be configured to determine that the MFA failure condition of multiple MFA push requests 210 is satisfied when the number of MFA push requests exceeds a predetermined number of MFA push requests.

The MFA failure conditions may include a condition 212 of multiple MFA push requests occurring with no successful login attempts. Condition 212 differs from condition 210 in that the system may be configured to determine a number of MFA push requests without successful login attempts, further determining whether a successful login attempt occurs in conjunction with the multiple MFA push requests. That is, in some example embodiments, the system may be configured to detect both a number of MFA push requests and the number of MFA push requests occurring without successful logins. For example, regarding condition 212, the system may identify that the MFA failure condition occurs when both a predetermined number of MFA push notifications are sent and no successful login attempts accompany the predetermined number of MFA push notifications, as opposed to condition 210, where the system may determine an MFA failure condition occurs when a predetermined number of MFA push notifications are sent, regardless as to whether any successful login attempt is made (in other words, condition 210 may be satisfied even with a successful login attempt).

The MFA failure conditions may include a condition 214 where multiple MFA login failures of the user occurs. That is, the system may determine that an MFA failure condition has occurred based on a number of login failures occurring exceeding a predetermined number of allowable login failures. As opposed to conditions 210 and 212, for condition 214, the system may not consider the number of push notifications in determining whether condition 214 is satisfied.

The MFA failure conditions may include condition 216 of at least one MFA push request being rejected by the user. That is, the system may track whether the user rejects authentication push requests provided by the authenticator application. The system may be configured to determine condition 216 is satisfied based on one push request being rejected by the user and/or based on a predetermined number of push requests being rejected by the user. As opposed to conditions 210 and 212, for condition 216, the system may not necessarily consider the number of push requests being sent (i.e., the system may only consider the number of push requests that are rejected by the user regardless of the number of push notifications being sent).

The MFA failure conditions may include condition 218 of multiple MFA verification code failures. In some example embodiments, instead of sending a push notification to a user to simply tap and accept a login attempt, the authenticator application may be configured to send the user an additional verification code to complete the MFA for access to the system. Thus, the system may determine the MFA failure condition 218 to be satisfied when a predetermined number (e.g., one or more) of MFA verification code failures occur.

The conditions 210-218 shown in the first stage 200 may be implemented individually, separately from other conditions, in conjunction with other conditions, and/or in combination with other conditions as will be understood by one of ordinary skill in the art from the disclosure herein.

In response to identifying an MFA failure condition occurring in the first stage 200, the system may in operation 201 determine whether a successful login attempt has occurred. The system may determine that a successful login attempt has occurred in the first stage 200 depending on the identified MFA failure condition, or the system may subsequently determine whether a successful login attempt has occurred in response to identifying an MFA failure condition has occurred in the first stage 200. Based on determining that a successful login attempt has occurred, the system may proceed to the second stage 202. In some embodiments, the system may assume that a successful login attempt has occurred and omit operation 201.

In the second stage 202, the system may determine whether a login violation condition of the successful login attempt has occurred. Prior to determining whether a login violation condition has occurred, the system may store a login history of a user over a predetermined time interval (e.g., a 90 day history or other suitable interval). The login history of the user may include an MFA login location history (e.g., city, country, etc.) as well as an MFA login IP address history of the user. Based on the login history of the user, the system may determine whether an MFA attack occurs, as is described in detail below.

The login violation condition may include condition 220 of a successful login attempt occurring in a location not included in the MFA login location history of the user and/or condition 222 of a successful login attempt occurring with an IP address not included in the MFA login IP address history of the user. Furthermore, the system may be configured to determine whether an MFA attack occurs by determining wither condition 220 or condition 222 occurs within a predetermined time period of a condition from the first stage 200 occurring. For example, in response to identifying an MFA failure condition occurring in the first stage 200, the system may be configured to determine whether an MFA attack occurs based on condition 220 and/or condition 222 occurring within about an hour of a condition from the first stage 200 being identified. Other predetermined time periods may be utilized based on parameters of authenticator applications, system accesses, or other factors as will be understood by one of ordinary skill in the art from the disclosure herein. Thus, when a condition 220/222 from the second stage 202 occurs within the predetermined time period from a condition 210-218 occurring from the first stage 200, the system may determine than an MFA attack has occurred.

In response to determining an MFA attack has occurred, the system may disconnect the access of the user (i.e., the access of the perpetrator), may send notifications to the user for credential changes, may reinitialize the access system, and/or other actions that would discontinue the MFA attack/successful malicious login.

Figure 3:
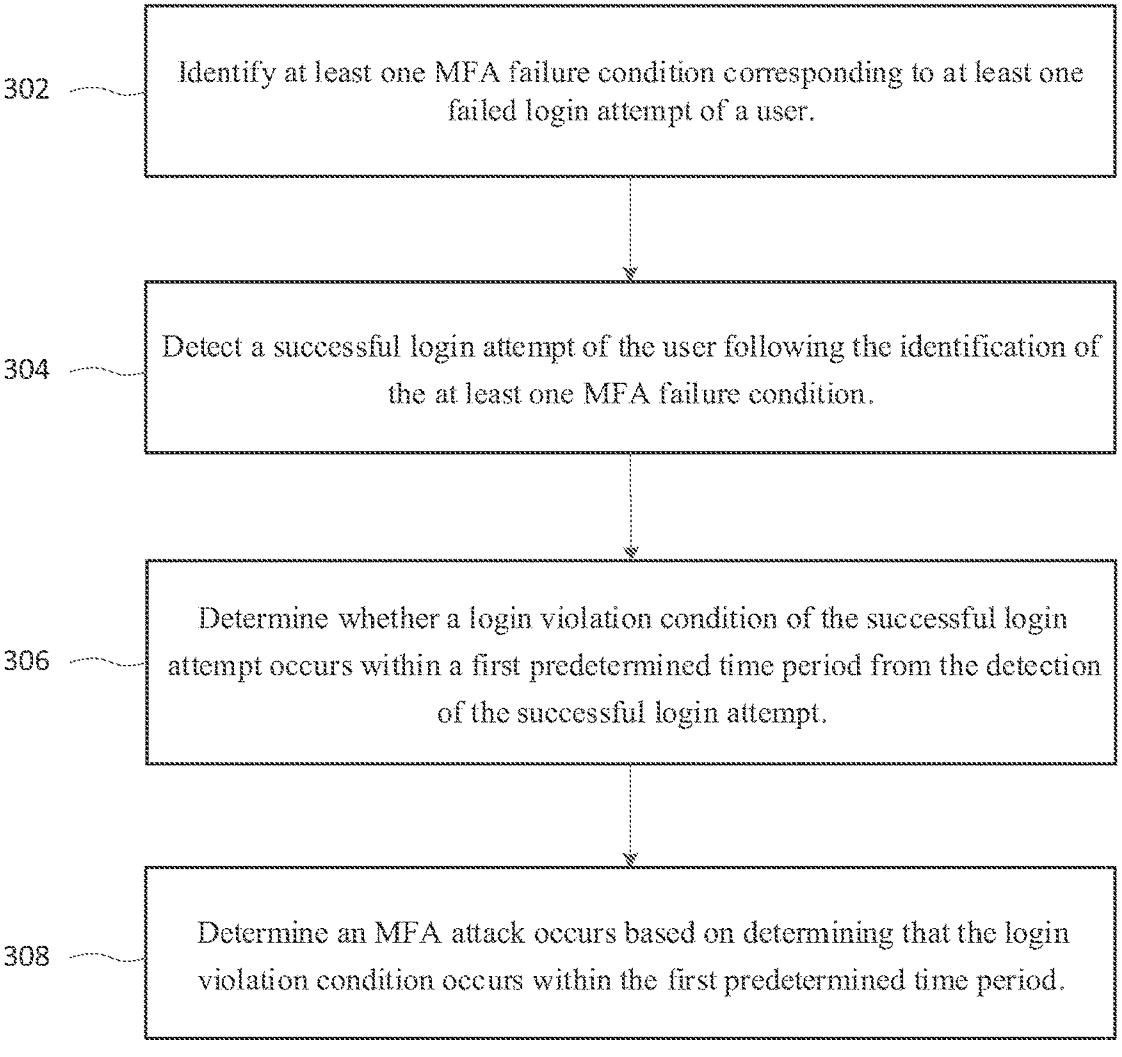
FIG. 3 is a flowchart of a method for detection of an MFA attack, according to an embodiment.

FIG. 3 is a flowchart of a method for detection of an MFA attack, according to an embodiment. In operation 302, the system may identify at least one MFA failure condition corresponding to at least one failed login attempt of a user. In operation 304, the system may detect a successful login attempt of the user following the identification of the at least one MFA failure condition. In operation 306, the system may determine whether a login violation condition of the successful login attempt occurs within a first predetermined time period from the detection of the successful login attempt. In operation 308, the system may determine an MFA attack occurs based on determining that the login violation condition occurs within the first predetermined time period.

The system may store a login history of the user over a second predetermined time period, the login history including at least one of an MFA login location history of the user and an MFA login IP address history of the user. The login violation condition may include the successful login attempt occurring at a location not included in the MFA login location history of the user, and the successful login attempt occurring with an IP address not included in the MFA login IP address history of the user. The predetermined time period may be about one hour. The at least one MFA failure condition corresponding to the at least one failed login attempt of the user may include multiple MFA push requests occurring, multiple MFA push requests occurring with no successful login attempts, multiple MFA login failures of the user, at least one MFA push request being rejected by the user, and multiple MFA verification code failures.

By identifying MFA failure conditions, subsequent successful login attempts, and then login violation conditions, attack behaviors specific to MFA attacks followed by successful login attempts from new IP addresses or new locations may be accurately and effectively detected, thereby increasing the likelihood of capturing a true positive MFA attack.

Figure 4:
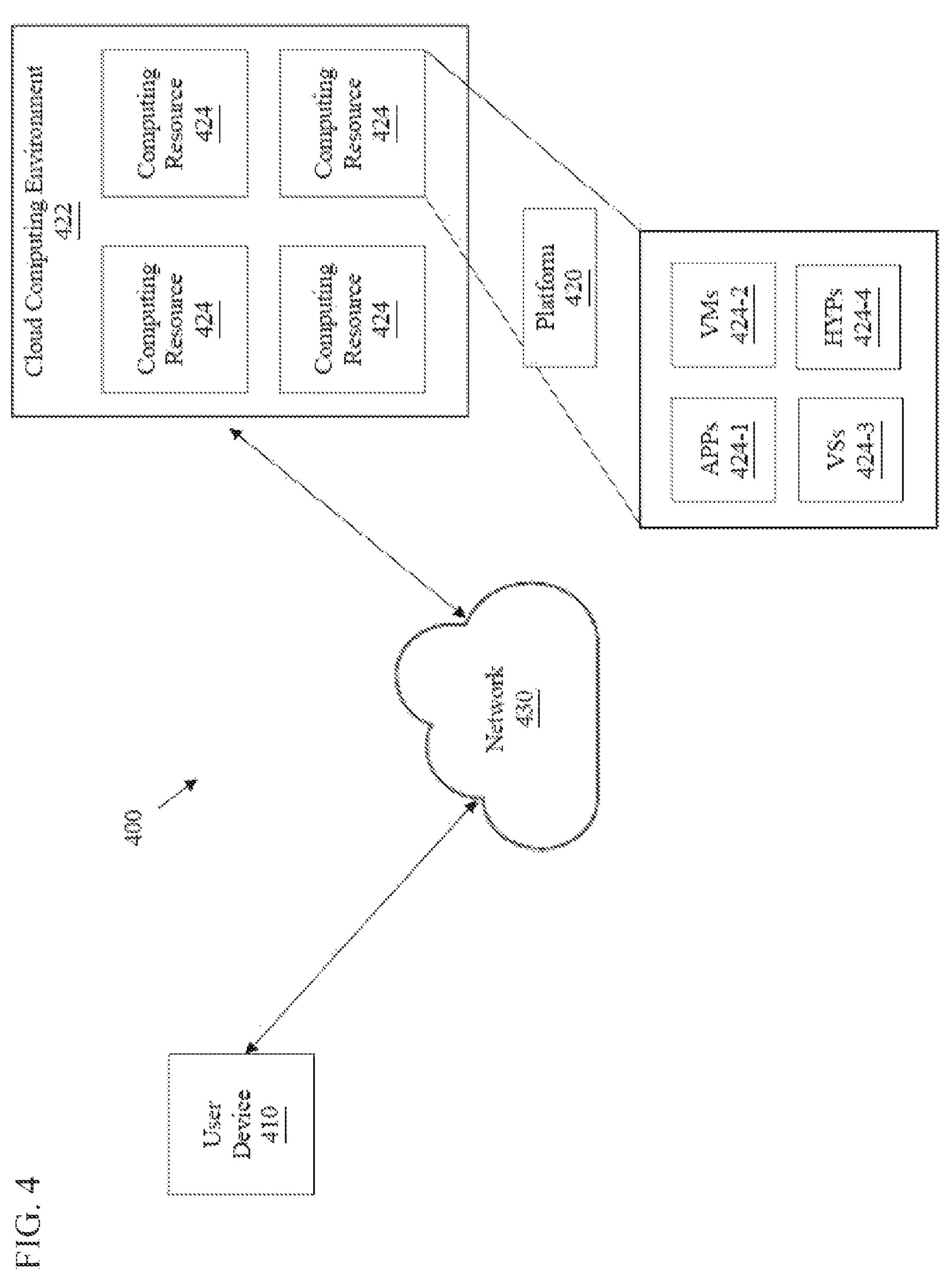
FIG. 4 is a diagram of an example environment in which systems and/or methods, described herein, may be implemented.

FIG. 4 is a diagram of an example environment 400 in which systems and/or methods, described herein, may be implemented. As shown in FIG. 4, environment 400 may include a user device 410, a platform 420, and a network 430. Devices of environment 400 may interconnect via wired connections, wireless connections, or a combination of wired and wireless connections. In embodiments, any of the functions and operations described with reference to FIG. 1 above may be performed by any combination of elements illustrated in FIG. 4.

User device 410 includes one or more devices capable of receiving, generating, storing, processing, and/or providing information associated with platform 420. For example, user device 410 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 410 may receive information from and/or transmit information to platform 420.

Platform 420 includes one or more devices capable of receiving, generating, storing, processing, and/or providing information. In some implementations, platform 420 may include a cloud server or a group of cloud servers. In some implementations, platform 420 may be designed to be modular such that certain software components may be swapped in or out depending on a particular need. As such, platform 420 may be easily and/or quickly reconfigured for different uses.

In some implementations, as shown, platform 420 may be hosted in cloud computing environment 422. Notably, while implementations described herein describe platform 420 as being hosted in cloud computing environment 422, in some implementations, platform 420 may not be cloud-based (i.e., may be implemented outside of a cloud computing environment) or may be partially cloud-based.

Cloud computing environment 422 includes an environment that hosts platform 420. Cloud computing environment 422 may provide computation, software, data access, storage, etc. services that do not require end-user (e.g., user device 410) knowledge of a physical location and configuration of system(s) and/or device(s) that hosts platform 420. As shown, cloud computing environment 422 may include a group of computing resources 424 (referred to collectively as "computing resources 424" and individually as "computing resource 424").

Computing resource 424 includes one or more personal computers, a cluster of computing devices, workstation computers, server devices, or other types of computation and/or communication devices. In some implementations, computing resource 424 may host platform 420. The cloud resources may include compute instances executing in computing resource 424, storage devices provided in computing resource 424, data transfer devices provided by computing resource 424, etc. In some implementations, computing resource 424 may communicate with other computing resources 424 via wired connections, wireless connections, or a combination of wired and wireless connections.

As further shown in FIG. 4, computing resource 424 includes a group of cloud resources, such as one or more applications ("APPs") 424-1, one or more virtual machines ("VMs") 424-2, virtualized storage ("VSs") 424-3, one or more hypervisors ("HYPs") 424-4, or the like.

Application 424-1 includes one or more software applications that may be provided to or accessed by user device 410. Application 424-1 may eliminate a need to install and execute the software applications on user device 410. For example, application 424-1 may include software associated with platform 420 and/or any other software capable of being provided via cloud computing environment 422. In some implementations, one application 424-1 may send/receive information to/from one or more other applications 424-1, via virtual machine 424-2.

Virtual machine 424-2 includes a software implementation of a machine (e.g., a computer) that executes programs like a physical machine. Virtual machine 424-2 may be either a system virtual machine or a process virtual machine, depending upon use and degree of correspondence to any real machine by virtual machine 424-2. A system virtual machine may provide a complete system platform that supports execution of a complete operating system ("OS"). A process virtual machine may execute a single program, and may support a single process. In some implementations, virtual machine 424-2 may execute on behalf of a user (e.g., user device 410), and may manage infrastructure of cloud computing environment 422, such as data management, synchronization, or long-duration data transfers.

Virtualized storage 424-3 includes one or more storage systems and/or one or more devices that use virtualization techniques within the storage systems or devices of computing resource 424. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 424-4 may provide hardware virtualization techniques that allow multiple operating systems (e.g., "guest operating systems") to execute concurrently on a host computer, such as computing resource 424. Hypervisor 424-4 may present a virtual operating platform to the guest operating systems, and may manage the execution of the guest operating systems. Multiple instances of a variety of operating systems may share virtualized hardware resources.

Network 430 includes one or more wired and/or wireless networks. For example, network 430 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
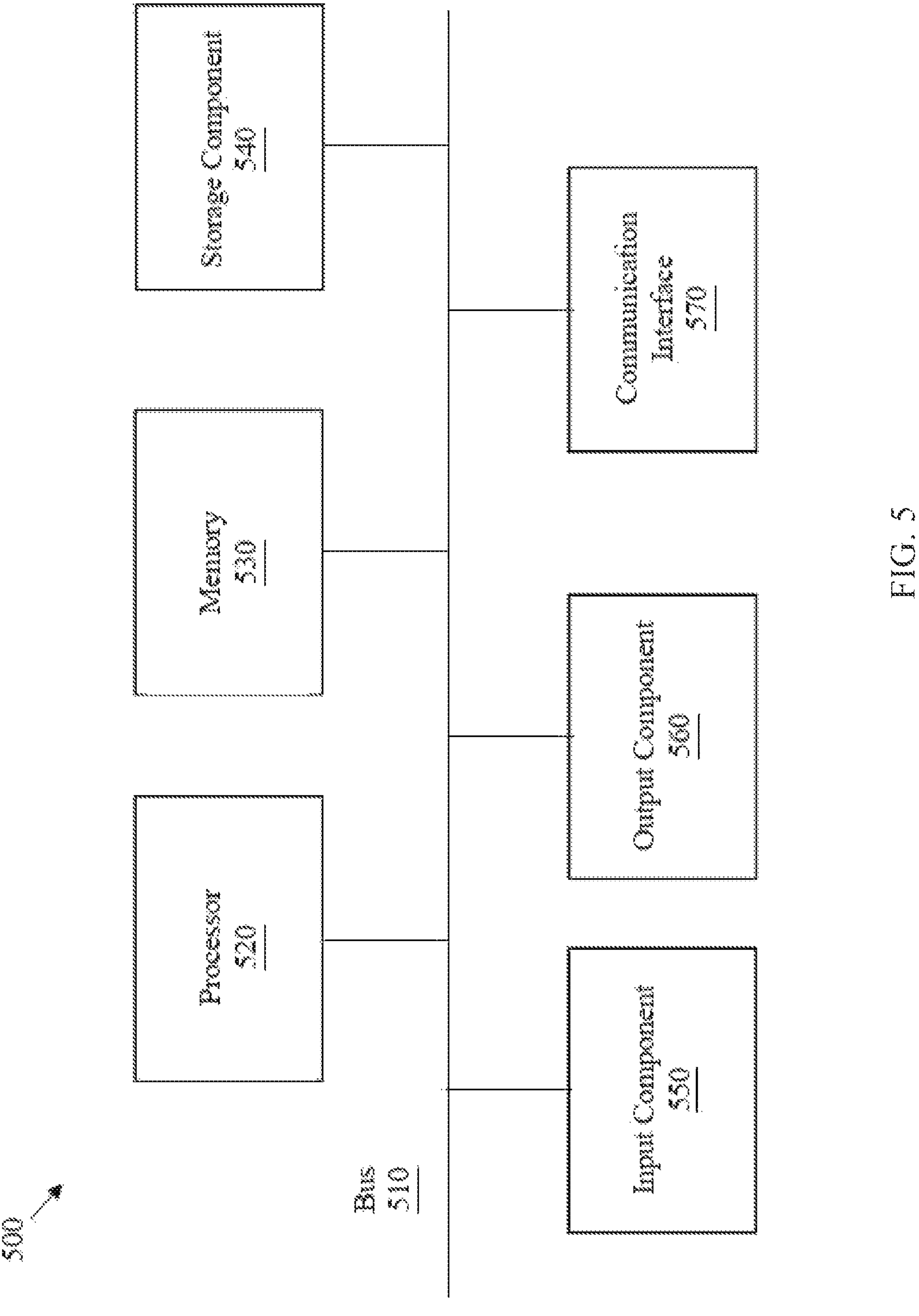
FIG. 5 is a diagram of example components of a device according to an embodiment.

FIG. 5 is a diagram of example components of a device 500. Device 500 may correspond to user device 410 and/or platform 420. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 may be implemented in hardware, firmware, or a combination of hardware and software. Processor 520 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, or the like.

Device 500 may perform one or more processes described herein. Device 500 may perform these processes in response to processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

In embodiments, any one of the operations or processes of FIGS. 1A, 1B, 1C, 2 and 3 may be implemented by or using any one of the elements illustrated in FIGS. 4 and 5.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method of detecting a multifactor authentication (MFA) attack, the method comprising:

identifying at least one MFA failure condition corresponding to at least one failed login attempt of a user, in which the user successfully completes a first authentication factor of the MFA and fails in a second authentication factor of the MFA;

detecting a successful login attempt of the user following the identification of the at least one MFA failure condition, the successful login attempt corresponding to successful completion of both the first authentication factor and the second authentication factor of the MFA;

determining whether a login violation condition of the successful login attempt occurs within a first predetermined time period from the identifying of the at least one MFA failure condition; and determining an MFA attack occurs based on detecting the successful login attempt as being after the identified at least one MFA failure condition and based on determining that the login violation condition occurs within the first predetermined time period.

2. The method of claim 1, further comprising storing a login history of the user over a second predetermined time period, the login history comprising at least one of an MFA login location history of the user and an MFA login internet protocol (IP) address history of the user.

3. The method of claim 2, wherein the login violation condition of the successful login attempt comprises at least one of:

the successful login attempt occurring at a location not included in the MFA login location history of the user; and the successful login attempt occurring with an IP address not included in the MFA login IP address history of the user.

4. The method of claim 1, wherein the first predetermined time period comprises about one hour.

5. The method of claim 1, wherein the at least one MFA failure condition corresponding to the at least one failed login attempt of the user comprises at least one of:

multiple MFA push requests occurring; and multiple MFA push requests occurring with no successful login attempts.

6. The method of claim 1, wherein the at least one MFA failure condition corresponding to the at least one failed login attempt of the user comprises multiple MFA login failures of the user.

7. The method of claim 1, wherein the at least one MFA failure condition corresponding to the at least one failed login attempt of the user comprises at least one MFA push request being rejected by the user.

8. The method of claim 1, wherein the at least one MFA failure condition corresponding to the at least one failed login attempt of the user comprises multiple MFA verification code failures.

9. A system for detecting a multifactor authentication (MFA) attack, the system comprising:

a memory storing instructions; and a processor configured to execute the instructions to:

identify at least one MFA failure condition corresponding to at least one failed login attempt of a user, in which the user successfully completes a first authentication factor of the MFA and fails in a second authentication factor of the MFA;

detect a successful login attempt of the user following the identification of the at least one MFA failure condition, the successful login attempt corresponding to successful completion of both the first authentication factor and the second authentication factor of the MFA;

determine whether a login violation condition of the successful login attempt occurs within a first predetermined time period from the identifying of the at least one MFA failure condition; and determine that an MFA attack occurs based on detecting the successful login attempt as being after the identified at least one MFA failure condition and based on determining that the login violation condition occurs within the first predetermined time period.

10. The system of claim 9, wherein the processor is further configured to execute the instructions to store a login history of the user over a second predetermined time period, the login history comprising at least one of an MFA login location history of the user and an MFA login internet protocol (IP) address history of the user.

11. The system of claim 10, wherein the login violation condition of the successful login attempt comprises at least one of:

the successful login attempt occurring at a location not included in the MFA login location history of the user; and the successful login attempt occurring with an IP address not included in the MFA login IP address history of the user.

12. The system of claim 9, wherein the first predetermined time period comprises about one hour.

13. The system of claim 9, wherein the at least one MFA failure condition corresponding to the at least one failed login attempt of the user comprises at least one of:

multiple MFA push requests occurring; and multiple MFA push requests occurring with no successful login attempts.

14. The system of claim 9, wherein the at least one MFA failure condition corresponding to the at least one failed login attempt of the user comprises multiple MFA login failures of the user.

15. The system of claim 9, wherein the at least one MFA failure condition corresponding to the at least one failed login attempt of the user comprises at least one MFA push request being rejected by the user.

16. The system of claim 9, wherein the at least one MFA failure condition corresponding to the at least one failed login attempt of the user comprises multiple MFA verification code failures.

17. A non-transitory computer-readable storage medium storing instructions that, when executed by at least one processor, cause the at least one processor to:

identify at least one multifactor authentication (MFA) failure condition corresponding to at least one failed login attempt of a user, in which the user successfully completes a first authentication factor of the MFA and fails in a second authentication factor of the MFA;

detect a successful login attempt of the user following the identification of the at least one MFA failure condition, the successful login attempt corresponding to successful completion of both the first authentication factor and the second authentication factor of the MFA;

determine whether a login violation condition of the successful login attempt occurs within a first predetermined time period from the identifying of the at least one MFA failure condition; and determine an MFA attack occurs based on detecting the successful login attempt as being after the identified at least one MFA failure condition and based on determining that the login violation condition occurs within the first predetermined time period.

18. The storage medium of claim 17, wherein the instructions, when executed, further cause the at least one processor to store a login history of the user over a second predetermined time period, the login history comprising at least one of an MFA login location history of the user and an MFA login internet protocol (IP) address history of the user.

19. The storage medium of claim 18, wherein the login violation condition of the successful login attempt comprises at least one of:

the successful login attempt occurring at a location not included in the MFA login location history of the user; and the successful login attempt occurring with an IP address not included in the MFA login IP address history of the user.

20. The storage medium of claim 17, wherein the at least one MFA failure condition corresponding to the at least one failed login attempt of the user comprises at least one of:

multiple MFA push requests occurring;

multiple MFA push requests occurring with no successful login attempts;

multiple MFA login failures of the user;

at least one MFA push request being rejected by the user; and multiple MFA verification code failures.

* * * * *